US010780740B2

(12) United States Patent
Chouvel

(10) Patent No.: US 10,780,740 B2
(45) Date of Patent: Sep. 22, 2020

(54) TIRE PROVIDED WITH A TREAD COMPRISING A DIENE ELASTOMER AND THERMOPLASTIC ELASTOMER SYSTEM

(71) Applicant: COMPAGNIE GENERALE DES ETABLISSEMENTS MICHELIN, Clermont-Ferrand (FR)

(72) Inventor: Christophe Chouvel, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 296 days.

(21) Appl. No.: 15/737,537

(22) PCT Filed: Jun. 7, 2016

(86) PCT No.: PCT/EP2016/062911
§ 371 (c)(1),
(2) Date: Dec. 18, 2017

(87) PCT Pub. No.: WO2016/202646
PCT Pub. Date: Dec. 22, 2016

(65) Prior Publication Data
US 2018/0178584 A1 Jun. 28, 2018

(30) Foreign Application Priority Data

Jun. 18, 2015 (FR) ...................... 15 55571

(51) Int. Cl.
| | |
|---|---|
| *B60C 1/00* | (2006.01) |
| *C08L 9/06* | (2006.01) |
| *C08L 53/02* | (2006.01) |
| *C08K 5/31* | (2006.01) |
| *C08K 5/47* | (2006.01) |
| *C08K 5/18* | (2006.01) |
| *C08K 3/36* | (2006.01) |
| *C08K 5/548* | (2006.01) |
| *C08K 3/22* | (2006.01) |
| *C08K 3/06* | (2006.01) |
| *C08K 3/04* | (2006.01) |
| *C08K 5/09* | (2006.01) |

(52) U.S. Cl.
CPC ............ *B60C 1/0016* (2013.01); *C08K 3/04* (2013.01); *C08K 3/06* (2013.01); *C08K 3/22* (2013.01); *C08K 3/36* (2013.01); *C08K 5/09* (2013.01); *C08K 5/18* (2013.01); *C08K 5/31* (2013.01); *C08K 5/47* (2013.01); *C08K 5/548* (2013.01); *C08L 9/06* (2013.01); *C08L 53/025* (2013.01)

(58) Field of Classification Search
CPC ...... B60C 1/0016; C08L 53/02; C08L 53/025; C08L 9/00; C08L 9/06
See application file for complete search history.

(56) References Cited

U.S. PATENT DOCUMENTS

| | | | |
|---|---|---|---|
| 3,382,212 A | 5/1968 | Price et al. | |
| 4,588,806 A | 5/1986 | Aycock et al. | |
| 5,013,718 A | 5/1991 | Adamson et al. | |
| 5,227,425 A | 7/1993 | Rauline | |
| 5,420,488 A | 5/1995 | Gutman | |
| 5,852,099 A | 12/1998 | Vanel | |
| 5,900,449 A | 5/1999 | Custodero et al. | |
| 5,977,238 A | 11/1999 | Labauze | |
| 6,329,459 B1 | 12/2001 | Kang et al. | |
| 6,503,973 B2 | 1/2003 | Robert et al. | |
| 6,536,492 B2 | 3/2003 | Vasseur | |
| 6,815,473 B2 | 11/2004 | Robert et al. | |
| 7,230,050 B2 * | 6/2007 | Robertson ................. | B60C 1/00 524/493 |

(Continued)

FOREIGN PATENT DOCUMENTS

| | | |
|---|---|---|
| CN | 102770284 A | 11/2012 |
| CN | 106414603 A | 2/2017 |

(Continued)

OTHER PUBLICATIONS

Derwent Abstract for Indian patent publication IN200401351 I3 published on Jul. 21, 2006.*
A.R. Shultz, et al., "Thermo-Optical and Differential Scanning Calorimetric Observations of Mobility Transitions in Polystyrene-Poly(2,6-Dimethyl-1,4-Phenylene Oxide) Blends", Journal of Applied Polymer Science, 16, pp. 461-471 (1972).
D.M. White, "Polyethers, Aromatic", Kirk-Othmer Encyclopedia of Chemical Technology, pp. 1-21 (2000).
"Reference: Polymer Properties", Polymer Products from Aldrich, pp. 52-53.

(Continued)

*Primary Examiner* — Nicholas E Hill
(74) *Attorney, Agent, or Firm* — Venable LLP

(57) ABSTRACT

A tire comprises a tread, a crown with a crown reinforcement, two sidewalls, two beads, a carcass reinforcement anchored to the two beads and extending from one sidewall to the other, characterized in that the tread comprises a composition based on at least a diene elastomer, at a content of between 35 and 99 phr (parts by weight per hundred parts of elastomer), a thermoplastic elastomer system, at a total content of between 1 and 65 phr, said thermoplastic elastomer system comprising at least two block copolymers, referred to as polystyrene and poly(butadiene/styrene) block copolymers, each comprising at least one elastomer block of optionally hydrogenated butadiene/styrene random copolymer type, and at least one thermoplastic block of styrene type, one of the two polystyrene and poly(butadiene/styrene) block copolymers being hydrogenated such that a proportion ranging from 95 to 100 mol % of the double bonds in the butadiene portion is hydrogenated, the latter being referred to as an essentially hydrogenated polystyrene and poly(butadiene/styrene) block copolymer.

51 Claims, No Drawings

(56) References Cited

U.S. PATENT DOCUMENTS

| | | | |
|---|---|---|---|
| 7,250,463 B2 | 7/2007 | Durel et al. | |
| 7,312,264 B2 | 12/2007 | Gandon-Pain | |
| 8,304,472 B2 | 11/2012 | Maeda | 523/351 |
| 9,132,699 B2 | 9/2015 | Lopitaux et al. | |
| 9,849,727 B2 | 12/2017 | Abad et al. | |
| 10,369,842 B2 | 8/2019 | Mad et al. | |
| 2001/0034389 A1 | 10/2001 | Vasseur | |
| 2001/0036991 A1 | 11/2001 | Robert et al. | |
| 2002/0037962 A1 | 3/2002 | Lechtenbohmer et al. | |
| 2002/0183436 A1 | 12/2002 | Robert et al. | |
| 2004/0151933 A1* | 8/2004 | Ajbani | B32B 25/04 428/515 |
| 2005/0004297 A1 | 1/2005 | Durel et al. | |
| 2005/0277736 A1* | 12/2005 | Ajbani | C08J 3/005 525/132 |
| 2006/0089445 A1 | 4/2006 | Gandon-Pain | |
| 2006/0089447 A1 | 4/2006 | Robertson et al. | |
| 2009/0212264 A1 | 8/2009 | Maeda | 252/500 |
| 2009/0283724 A1 | 11/2009 | Maeda | 252/500 |
| 2010/0108239 A1 | 5/2010 | Recker et al. | |
| 2012/0065292 A1 | 3/2012 | Lopitaux et al. | |
| 2012/0309865 A1* | 12/2012 | Lopez | B60C 1/0016 523/156 |
| 2012/0318425 A1* | 12/2012 | Lopez | C08L 53/02 152/526 |
| 2014/0076473 A1* | 3/2014 | Abad | B60C 1/0016 152/209.1 |
| 2014/0083589 A1 | 3/2014 | Abad et al. | |
| 2014/0299249 A1 | 10/2014 | Custodero et al. | |
| 2014/0343190 A1 | 11/2014 | Custodero et al. | |
| 2014/0343216 A1 | 11/2014 | Custodero et al. | |
| 2015/0034226 A1 | 2/2015 | Abad et al. | |
| 2015/0034230 A1 | 2/2015 | Abad et al. | |
| 2015/0210117 A1 | 7/2015 | Greiveldinger et al. | |
| 2015/0231925 A1* | 8/2015 | Custodero | B60C 1/0016 152/209.1 |
| 2015/0258753 A1 | 9/2015 | Custodero et al. | |
| 2016/0031190 A1 | 2/2016 | Greiveldinger et al. | |
| 2016/0339743 A1 | 11/2016 | Abad et al. | |
| 2016/0347121 A1 | 12/2016 | Greiveldinger et al. | |
| 2017/0151842 A1 | 6/2017 | Custodero et al. | |
| 2017/0151843 A1 | 6/2017 | Custodero et al. | |
| 2017/0313130 A1 | 11/2017 | Chouvel et al. | |
| 2018/0186184 A1* | 7/2018 | Chouvel | C08L 9/06 |

FOREIGN PATENT DOCUMENTS

| | | | |
|---|---|---|---|
| EP | 0 501 227 A1 | 9/1992 | |
| EP | 0 735 088 A1 | 10/1996 | |
| EP | 0 810 258 A1 | 12/1997 | |
| EP | 1 127 909 A1 | 8/2001 | |
| EP | 2 022 827 A1 | 2/2009 | |
| FR | 2 740 778 A1 | 5/1997 | |
| FR | 2 765 882 A1 | 1/1999 | |
| FR | 2952644 | 5/2011 | |
| IN | 1351/MUM/2004 A | 7/2006 | |
| WO | 00/05300 A1 | 2/2000 | |
| WO | 00/05301 A1 | 2/2000 | |
| WO | WO-0117800 A1 * | 3/2001 | C08L 7/00 |
| WO | 0192402 A1 | 12/2001 | |
| WO | 03/16387 A1 | 2/2003 | |
| WO | 2004/096865 A2 | 11/2004 | |
| WO | 2010105984 A1 | 9/2010 | |
| WO | 2011/076635 A1 | 6/2011 | |
| WO | 2012/152686 A1 | 11/2012 | |
| WO | WO-2014041167 A1 * | 3/2014 | B60C 15/0009 |

OTHER PUBLICATIONS

B. Elvers, S. Hawkins, and G. Schulz (eds.), "Poly(Phenylene Oxides)", Ullmann's Encyclopedia of Industrial chemistry, published by VCH, vol. A 21, 5th edition, pp. 605-614 (1992).

L. Busse, et al., "Modelling of Dry and Wet Friction of Silica Filled Elastomers on Self-Affine Road Surfaces", Elastomere Friction, LNACM 51, pp. 1-26 (2010).

* cited by examiner

TIRE PROVIDED WITH A TREAD COMPRISING A DIENE ELASTOMER AND THERMOPLASTIC ELASTOMER SYSTEM

FIELD OF THE INVENTION

The present invention relates to tyres provided with a tread.

RELATED ART

In a conventional tyre, the tread comprises diene elastomers as elastomer. This type of tread is well known and described in numerous documents.

In some documents, treads comprising a mixture of diene elastomer and thermoplastic elastomer have been described. For example, document WO 2010/105984 describes tread compositions comprising a styrene/butadiene copolymer (SBR), a polybutadiene (BR) and an unsaturated thermoplastic styrene elastomer (TPS) and also a reinforcing filler for improving the wear resistance of the tyres.

Within the context of the compromise between improving rolling resistance and improving wet grip of the tyres, the applicants previously described, in document WO 2012/152686, a tyre provided with a tread comprising at least one thermoplastic elastomer, said thermoplastic elastomer being a block copolymer comprising at least one elastomer block and at least one thermoplastic block, the total content of thermoplastic elastomer being within a range varying from 65 to 100 phr (parts by weight per hundred parts of elastomer). In particular, the applicants described a tread comprising as thermoplastic elastomer the styrene/isoprene/styrene (SIS) triblock copolymer as enabling a reduction in rolling resistance compared to treads of conventional composition.

A constant goal of tyre manufacturers remains that of improving a balance in performance properties that are difficult to reconcile, namely the rolling resistance of the tyres and their wet grip.

Now, the applicants have surprisingly found that a tyre provided with a tread comprising a system of specific thermoplastic elastomers and a diene elastomer made it possible to obtain an excellent balance between rolling resistance and wet grip.

BRIEF DESCRIPTION OF EMBODIMENTS OF THE INVENTION

The subject of the present invention is therefore a tyre comprising a tread, a crown with a crown reinforcement, two sidewalls, two beads, a carcass reinforcement anchored to the two beads and extending from one sidewall to the other, characterized in that the tread comprises a composition based on at least a diene elastomer, at a content of between 35 and 99 phr (parts by weight per hundred parts of elastomer), and a thermoplastic elastomer system, at a total content of between 1 and 65 phr, said thermoplastic elastomer system comprising at least two block copolymers, referred to as polystyrene and poly(butadiene/styrene) block copolymers, each comprising at least one elastomer block of optionally hydrogenated butadiene/styrene random copolymer type, and at least one thermoplastic block of styrene type, one of the two polystyrene and poly(butadiene/styrene) block copolymers being hydrogenated such that a proportion ranging from 95 to 100 mol % of the double bonds in the butadiene portion is hydrogenated, the latter being referred to as an essentially hydrogenated polystyrene and poly(butadiene/styrene) block copolymer.

Preferentially, the invention relates to a tyre as defined above, wherein the content of diene elastomer is within a range extending from 40 to 90 phr and the content of thermoplastic elastomer is within a range extending from 10 to 60 phr. Preferentially, the content of diene elastomer is within a range extending from 50 to 80 phr and the content of thermoplastic elastomer is within a range extending from 20 to 50 phr. More preferentially, the content of diene elastomer is within a range extending from 55 to 70 phr and the content of thermoplastic elastomer is within a range extending from 30 to 45 phr.

Preferentially, the invention relates to a tyre as defined above, wherein the number-average molecular weight of the polystyrene and poly(butadiene/styrene) block copolymers is between 30 000 and 500 000 g/mol.

Also preferentially, the invention relates to a tyre as defined above, wherein the poly(butadiene/styrene) blocks of the polystyrene and poly(butadiene/styrene) block copolymers are selected from poly(butadiene/styrene)s having a glass transition temperature of less than 25° C.

Still preferentially, the invention relates to a tyre as defined above, in which the poly(butadiene/styrene) blocks have a styrene content within a range extending from 10 to 60%. Preferably, the poly(butadiene/styrene) blocks have a content of 1,2-bonds for the butadiene part within a range extending from 4 mol % to 75 mol % and a content of 1,4-bonds within a range extending from 20 mol % to 96 mol %.

Preferably, the invention relates to a tyre as defined above, wherein the essentially hydrogenated block copolymer is hydrogenated such that a proportion ranging from 96 to 100 mol %, and preferably from 98 to 100 mol %, of the double bonds in the butadiene portion is hydrogenated.

Also preferentially, the invention relates to a tyre as defined above, wherein the thermoplastic elastomer system comprises, in addition to the essentially hydrogenated polystyrene and poly(butadiene/styrene) block copolymer, a polystyrene and poly(butadiene/styrene) block copolymer which is referred to as partially hydrogenated, which is hydrogenated such that a proportion ranging from 25 to 95 mol % of the double bonds in the butadiene portion is hydrogenated. Preferentially, the partially hydrogenated polystyrene and poly(butadiene/styrene) block copolymer is hydrogenated such that a proportion ranging from 25 mol % to 80 mol %, and preferably from 40 mol % to 70 mol %, of the double bonds in the butadiene portion is hydrogenated.

Still preferentially, the invention relates to a tyre as defined above, wherein the thermoplastic elastomer system comprises from 20 to 50 phr, preferably from 25 to 35 phr, of essentially hydrogenated polystyrene and poly(butadiene/styrene) block copolymer and from 1 to 15 phr, preferably from 3 to 10 phr, of partially hydrogenated polystyrene and poly(butadiene/styrene) block copolymer.

Preferentially, the invention relates to a tyre as defined above, wherein the thermoplastic styrene block(s) of the polystyrene and poly(butadiene/styrene) block copolymer are chosen from polymers having a glass transition temperature of greater than 80° C. and, in the case of a semicrystalline thermoplastic block, a melting point of greater than 80° C. Preferably, the fraction of thermoplastic styrene block in the polystyrene and poly(butadiene/styrene) block copolymer is within a range extending from 5 to 70%. Preferably, the thermoplastic block(s) of the polystyrene and poly(butadiene/styrene) block copolymer are chosen from polystyrenes, preferentially from polystyrenes obtained from styrene monomers selected from the group consisting of unsubstituted styrene, substituted styrenes and mixtures thereof; and more preferentially, from polystyrenes obtained from styrene monomers selected from the group consisting of unsubstituted styrene, methylstyrenes, para-tert-butylstyrene, chlorostyrenes, bromostyrenes, fluorostyrenes, para-hydroxystyrene and mixtures thereof. Very preferentially, the thermoplastic block(s) of the polystyrene and poly (butadiene/styrene) block copolymer are chosen from polystyrenes obtained from styrene monomers selected from the group consisting of unsubstituted styrene, o-methylstyrene, m-methylstyrene, p-methylstyrene, alpha-methylstyrene, alpha,2-dimethylstyrene, alpha,4-dimethylstyrene, diphenylethylene, para-tert-butylstyrene, o-chlorostyrene, m-chlorostyrene, p-chlorostyrene, 2,4-dichlorostyrene, 2,6-dichlorostyrene, 2,4,6-trichlorostyrene, o-bromostyrene, m-bromostyrene, p-bromostyrene, 2,4-dibromostyrene, 2,6-dibromostyrene, 2,4,6-tribromostyrene, o-fluorostyrene, m-fluorostyrene, p-fluorostyrene, 2,4-difluorostyrene, 2,6-difluorostyrene, 2,4,6-trifluorostyrene, para-hydroxystyrene and mixtures thereof. More preferentially, the thermoplastic block(s) of the polystyrene and poly(butadiene/styrene) block copolymer are obtained from unsubstituted polystyrene.

Preferentially, the invention relates to a tyre as defined above, wherein the diene elastomer (that is to say the diene elastomer(s)) is selected from the group consisting of essentially unsaturated diene elastomers and mixtures thereof. Preferably, the diene elastomer is selected from the group consisting of homopolymers obtained by polymerization of a conjugated diene monomer having from 4 to 12 carbon atoms, copolymers obtained by copolymerization of one or more conjugated dienes with one another or with one or more vinylaromatic compounds having from 8 to 20 carbon atoms, and mixtures thereof. More preferentially, the diene elastomer is selected from the group consisting of polybutadienes, synthetic polyisoprenes, natural rubber, butadiene copolymers, isoprene copolymers and the mixtures of these elastomers. Very preferentially, the diene elastomer is selected from the group consisting of butadiene and styrene copolymers.

Also preferentially, the invention relates to a tyre as defined above, wherein the composition of the tread further comprises reinforcing filler at a content of less than 80 phr, preferably less than 60 phr. Preferably, the content of reinforcing filler is from 3 to 50 phr, preferably from 5 to 40 phr. Preferentially, the reinforcing filler is carbon black and/or silica. According to a preferred embodiment, the predominant reinforcing filler is silica. Alternatively and also preferentially, the predominant reinforcing filler is carbon black.

According to a preferential embodiment, the invention relates to a tyre as defined above, wherein the composition of the tread further comprises a thermoplastic resin based on optionally substituted polyphenylene ether units, at a content within a range extending from 1 to 50 phr, preferably from 2 to 40 phr. Preferentially, the content of said thermoplastic resin based on optionally substituted polyphenylene ether units is within a range extending from 2 to 30 phr, preferably from 2 to 20 phr. Preferably, the thermoplastic resin based on optionally substituted polyphenylene ether units has a glass transition temperature (Tg), measured by DSC according to standard ASTM D3418, 1999, within a range extending from 0 to 280° C., preferably from 5 to 250° C. Also preferentially, the thermoplastic resin based on optionally substituted polyphenylene ether units is a compound comprising predominantly polyphenylene units of general formula (I):

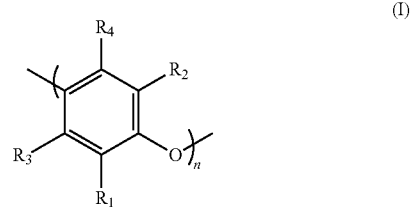

in which:
R1, R2, R3 and R4 represent, independently of one another, identical or different groups selected from hydrogen, hydroxy, alkoxy, halogen, amino, alkylamino or dialkylamino groups or hydrocarbon-based groups comprising at least 2 carbon atoms, optionally interrupted by heteroatoms and optionally substituted; R1 and R3 on the one hand, and R2 and R4 on the other, possibly forming, together with the carbon atoms to which they are attached, one or more rings fused to the benzene ring of the compound of formula (I), n is an integer within a range extending from 3 to 300.

According to this same preferential embodiment, the invention relates to a tyre as defined above, in which R1 and R2 represent an alkyl group and in particular a methyl group, and R3 and R4 represent hydrogen atoms. Also preferentially, the thermoplastic resin based on optionally substituted polyphenylene ether units is a compound which predominantly comprises polyphenylene units of general formula (I) in which n is an integer within a range extending from 3 to 50, preferably from 5 to 30, better still from 6 to 20. Still preferentially according to this embodiment, the thermoplastic resin based on optionally substituted polyphenylene ether units is a compound which comprises more than 80% by weight, preferably more than 95% by weight, of polyphenylene units of general formula (I).

Preferably, the invention relates to a tyre as defined above, wherein the composition of the tread does not comprise a plasticizing system or comprises a plasticizing system with a total plasticizer content of less than 20 phr, preferably less than 15 phr. More preferably, the composition of the tread does not comprise a plasticizing system other than the optional thermoplastic resin based on polyphenylene ether units or comprises a plasticizing system with a total plasticizer content of less than 10 phr, preferably less than 5 phr.

Preferentially, the invention relates to a tyre as defined above, wherein the tread composition further comprises a crosslinking system.

The invention relates more particularly to the tyres intended to equip motorless vehicles, such as bicycles, or motor vehicles of the following types: passenger vehicles, SUVs (Sport Utility Vehicles), two-wheeled vehicles (especially motorcycles), aircraft, as well as industrial vehicles chosen from vans, "heavy-duty" vehicles—that is to say, underground trains, buses, heavy road transport vehicles (lorries, tractors, trailers) or off-road vehicles, such as agricultural vehicles or earthmoving equipment—or other transportation or handling vehicles.

DETAILED DESCRIPTION OF THE INVENTION

In the present description, unless expressly indicated otherwise, all the percentages (%) shown are percentages by weight.

Moreover, the term "phr" means, within the context of the present patent application, parts by weight per hundred parts of elastomer, thermoplastic and non-thermoplastic elastomers mixed together. Within the context of the present invention, thermoplastic elastomers (TPEs) are included among the elastomers.

Furthermore, any range of values denoted by the expression "between a and b" represents the range of values extending from more than a to less than b (that is to say, limits a and b excluded), whereas any range of values denoted by the expression "from a to b" means the range of values extending from a up to b (that is to say, including the strict limits a and b).

Finally, when reference is made to a "predominant" compound, this is intended to mean, within the context of the present invention, that this compound is predominant among the compounds of the same type in the composition, that is to say that it is the one which represents the greatest amount by weight among the compounds of the same type. Thus, for example, a predominant reinforcing filler is the reinforcing filler representing the greatest weight with respect to the total weight of the reinforcing fillers in the composition. On the contrary, a "minor" compound is a compound which does not represent the greatest fraction by weight among the compounds of the same type.

1. Composition of the Tread

The tyre according to the invention has the essential feature of comprising a tread, a crown with a crown reinforcement, two sidewalls, two beads, a carcass reinforcement anchored to the two beads and extending from one sidewall to the other, wherein the tread comprises a composition based on at least a diene elastomer, at a content of between 35 and 99 phr (parts by weight per hundred parts of elastomer), and a thermoplastic elastomer system, at a total content of between 1 and 65 phr, said thermoplastic elastomer system comprising at least two block copolymers, referred to as polystyrene and poly(butadiene/styrene) block copolymers, each comprising at least one elastomer block of optionally hydrogenated butadiene/styrene random copolymer type, and at least one thermoplastic block of styrene type, one of the two polystyrene and poly(butadiene/styrene) block copolymers being hydrogenated such that a proportion ranging from 95 to 100 mol % of the double bonds in the butadiene portion is hydrogenated, the latter being referred to as an essentially hydrogenated polystyrene and poly(butadiene/styrene) block copolymer.

1.1 Specific Thermoplastic Elastomer (TPE) with SBR and PS Blocks

Generally, thermoplastic elastomers (abbreviated to "TPEs") have a structure intermediate between elastomers and thermoplastic polymers. These are block copolymers consisting of rigid thermoplastic blocks connected via flexible elastomer blocks.

For the purposes of the invention, said thermoplastic elastomer system comprises at least two block copolymers, referred to as polystyrene (denoted "PS") and poly(butadiene/styrene) (denoted "SBR") block copolymers, each comprising at least one elastomer block of optionally hydrogenated butadiene/styrene random copolymer type and at least one thermoplastic block of styrene type, one of the two polystyrene and poly(butadiene/styrene) block copolymers being hydrogenated such that a proportion ranging from 95 to 100 mol % of the double bonds in the butadiene portion is hydrogenated, the latter being referred to as an essentially hydrogenated polystyrene and poly(butadiene/styrene) block copolymer. In the following text, when reference is made to an SBR block, this is therefore an elastomeric block composed predominantly (that is to say to more than 50% by weight, preferably to more than 80% by weight) of a butadiene/styrene random copolymer, this copolymer possibly being or not being hydrogenated, and when reference is made to a styrene block, this is a block composed predominantly (that is to say to more than 50% by weight, preferably to more than 80% by weight) of a styrene polymer such as a polystyrene.

Unless expressly indicated otherwise in the following text, the information given for the TPEs with SBR and PS blocks, also referred to as polystyrene (PS) and poly(butadiene/styrene) (SBR) block copolymers, are valid for all the polystyrene and poly(butadiene-styrene) block copolymers of the thermoplastic elastomer system; that is to say regardless of their level of hydrogenation, whether they are essentially hydrogenated or partially hydrogenated or even non-hydrogenated.

1.1.1. Structure of the TPEs with SBR and PS Blocks

The number-average molecular weight (denoted Mn) of the TPEs with SBR and PS blocks is preferentially between 30 000 and 500 000 g/mol, more preferentially between 40 000 and 400 000 g/mol. Below the minima indicated, there is a risk of the cohesion between the SBR elastomer chains of the TPE with SBR and PS blocks being affected, especially due to its possible dilution (in the presence of an extending oil); furthermore, an increase in the working temperature risks affecting the mechanical properties, especially the properties at break, with the consequence of a reduced "hot" performance. Furthermore, an excessively high Mn can be detrimental for processing. Thus, it has been observed that a value within a range from 50 000 to 300 000 g/mol, and better still from 60 000 to 150 000 g/mol, was particularly well suited, especially to use of the TPE with SBR and PS blocks in a tyre tread composition.

The number-average molecular weight (Mn) of the TPE elastomers with SBR and PS blocks is determined in a known way by size exclusion chromatography (SEC). For example, in the case of styrene thermoplastic elastomers, the sample is dissolved beforehand in tetrahydrofuran at a concentration of approximately 1 g/l and then the solution is filtered through a filter with a porosity of 0.45 μm before injection. The apparatus used is a Waters Alliance chromatographic line. The elution solvent is tetrahydrofuran, the flow rate is 0.7 ml/min, the temperature of the system is 35° C. and the analytical time is 90 min. A set of four Waters columns in series, with the Styragel tradenames (HMW7, HMW6E and two HT6Es), is used. The injected volume of the solution of the polymer sample is 100 μl. The detector is a Waters 2410 differential refractometer and its associated software, for making use of the chromatographic data, is the Waters Millennium system. The calculated average molar masses are relative to a calibration curve produced with polystyrene standards. The conditions can be adjusted by those skilled in the art.

The value of the polydispersity index PI (reminder: PI=Mw/Mn, with Mw the weight-average molecular weight and Mn the number-average molecular weight) of the TPEs with SBR and PS blocks is preferably less than 3, more preferentially less than 2 and even more preferentially less than 1.5.

In a known way, the TPEs with SBR and PS blocks have two glass transition temperature peaks (Tg, measured according to ASTM D3418), the lowest temperature being relative to the SBR elastomer part of the TPE with SBR and PS blocks and the highest temperature being relative to the thermoplastic PS part of the TPE with SBR and PS blocks. Thus, the flexible SBR blocks of the TPEs with SBR and PS blocks are defined by a Tg which is less than ambient temperature (25° C.), while the rigid PS blocks have a Tg which is greater than 80° C.

In the present application, when reference is made to the glass transition temperature of the TPEs with SBR and PS blocks, this is the Tg relative to the SBR elastomer block. The TPEs with SBR and PS blocks preferentially have a glass transition temperature ("Tg") which is preferentially less than or equal to 25° C., more preferentially less than or equal to 10° C. A Tg value greater than these minima can reduce the performance of the tread when used at very low temperature; for such a use, the Tg of the TPEs with SBR and PS blocks is more preferentially still less than or equal to −10° C. Also preferentially, the Tg of the TPEs with SBR and PS blocks is greater than −100° C.

The TPEs with SBR and PS blocks can be copolymers with a small number of blocks (less than 5, typically 2 or 3), in which case these blocks preferably have high weights of greater than 15 000 g/mol. These TPEs with SBR and PS blocks can, for example, be diblock copolymers, comprising one thermoplastic block and one elastomer block. They are often also triblock elastomers with two rigid segments connected by one flexible segment. The rigid and flexible segments can be positioned linearly, or in a star-branched or branched configuration. Typically, each of these segments or blocks often contains at least more than 5, generally more than 10, base units (for example, styrene units and butadiene/styrene units for a styrene/SBR/styrene block copolymer).

The TPEs with SBR and PS blocks can also comprise a large number of smaller blocks (more than 30, typically from 50 to 500), in which case these blocks preferably have relatively low weights, for example from 500 to 5000 g/mol; these TPEs with SBR and PS blocks will subsequently be referred to as multiblock TPEs with SBR and PS blocks and are an elastomer block/thermoplastic block series.

According to a first variant, the TPE with SBR and PS blocks is in a linear form. For example, the TPE with SBR and PS blocks is a diblock copolymer: PS block/SBR block. The TPE with SBR and PS blocks can also be a triblock copolymer: PS block/SBR block/PS block, that is to say one central elastomer block and two terminal thermoplastic blocks, at each of the two ends of the elastomer block. Equally, the multiblock TPE with SBR and PS blocks can be a linear series of SBR elastomer blocks/thermoplastic PS blocks.

According to another variant of the invention, the TPE with SBR and PS blocks of use for the requirements of the invention is in a star-branched form comprising at least three branches. For example, the TPE with SBR and PS blocks can then be composed of a star-branched SBR elastomer block comprising at least three branches and of a thermoplastic PS block located at the end of each of the branches of the SBR elastomer block. The number of branches of the central elastomer can vary, for example, from 3 to 12 and preferably from 3 to 6.

According to another variant of the invention, the TPE with SBR and PS blocks is provided in a branched or dendrimer form. The TPE with SBR and PS blocks can then be composed of a branched or dendrimer SBR elastomer block and of a thermoplastic PS block located at the end of the branches of the dendrimer elastomer block.

1.1.2. Nature of the Elastomer Blocks

For the requirements of the invention, the elastomer blocks of the TPE with SBR and PS blocks may be all the elastomers of butadiene/styrene random copolymer type (SBR) known to those skilled in the art.

The fraction of SBR elastomer block in the TPE with SBR and PS blocks is within a range extending from 30% to 95%, preferentially from 40% to 92% and more preferentially from 50% to 90%.

These SBR blocks preferably have a Tg (glass transition temperature) measured by DSC according to standard ASTM D3418, 1999, of less than 25° C., preferentially less than 10° C., more preferentially less than 0° C. and very preferentially less than −10° C. Also preferentially, the Tg of the SBR blocks is greater than −100° C. SBR blocks having a Tg of between 20° C. and −70° C., and more particularly between 0° C. and −50° C., are especially suitable.

In a well-known way, the SBR block comprises a styrene content, a content of 1,2-bonds of the butadiene part and a content of 1,4-bonds of the butadiene part, the latter being composed of a content of trans-1,4-bonds and a content of cis-1,4-bonds when the butadiene part is not hydrogenated.

Preferentially, use is especially made of an SBR block having a styrene content for example within a range extending from 10% to 60% by weight, preferably from 20% to 50% by weight, and for the butadiene part, a content of 1,2-bonds within a range extending from 4% to 75% (mol %) and a content of 1,4-bonds within a range extending from 20% to 96% (mol %).

Depending on the degree of hydrogenation of the SBR block, the content of double bonds in the butadiene part of the SBR block can decrease as far as a content of 0 mol % for a completely hydrogenated SBR block.

According to the invention, the thermoplastic elastomer system comprises at least one polystyrene and poly(butadiene/styrene) block copolymer that is essentially hydrogenated, that is to say hydrogenated such that a proportion ranging from 95 to 100 mol % of the double bonds in the butadiene portion is hydrogenated.

The degree of hydrogenation is determined by NMR analysis. The spectra are acquired on a Bruker Avance 500 MHz spectrometer equipped with a $^1$H-X 5 mm Cryoprobe. The quantitative $^1$H NMR experiment uses a simple 30° pulse sequence and a repetition time of 5 seconds between each acquisition. 64 accumulations are carried out. The samples (approximately 25 mg) are dissolved in approximately 1 ml of $CS_2$, 100 μl of deuterated cyclohexane are added to carry out the lock during acquisition. The chemical shifts are calibrated relative to the protonated impurity of the $CS_2$ $^1$H δ ppm at 7.18 ppm, with reference to TMS ($^1$H δ ppm at 0 ppm). The $^1$H NMR spectrum makes it possible to quantify the microstructure by integration of the signal peaks characteristic of the different units:

The styrene originating from the SBR and the polystyrene blocks. It is quantifiable in the aromatics region between 6.0 ppm and 7.3 ppm for 5 protons (with subtraction of the integral of the signal of the $CS_2$ impurity at 7.18 ppm).

The PB1-2 originating from the SBR. It is quantifiable in the ethylenics region between 4.6 ppm and 5.1 ppm for 2 protons.

The PB1-4 originating from the SBR. It is quantifiable in the ethylenics region between 5.1 ppm and 6.1 ppm for 2 protons and with deletion of 1 proton of the PB1-2 unit.

The hydrogenated PB1-2 originating from the hydrogenation, and only having aliphatic protons. The pendent $CH_3$s of the hydrogenated PB1-2 were identified and are quantifiable in the aliphatics region between 0.4 and 0.8 ppm for 3 protons.

The hydrogenated PB1-4 originating from the hydrogenation, and only having aliphatic protons. It will be deduced by subtracting the aliphatic protons from the different units, considering it for 8 protons.

The microstructure may be quantified in terms of mol % as follows: mol % of a unit=$^1$H integral of a unit/$\Sigma$($^1$H integrals of each unit). For example, for a styrene unit: mol % of styrene=($^1$H integral of styrene)/($^1$H integral of styrene+$^1$H integral of PB1-2+$^1$H integral of PB1-4+$^1$H integral of hydrogenated PB1-2+$^1$H integral of hydrogenated PB1-4).

Preferably, the essentially hydrogenated block copolymer is hydrogenated such that a proportion ranging from 96 to 100 mol %, and preferably from 98 to 100 mol %, of the double bonds in the butadiene portion is hydrogenated.

According to a preferential embodiment, the thermoplastic elastomer system comprises, in addition to the essentially hydrogenated polystyrene and poly(butadiene/styrene) block copolymer, a polystyrene and poly(butadiene/styrene) block copolymer which is referred to as partially hydrogenated, which is hydrogenated such that a proportion ranging from 25 to 95 mol % of the double bonds in the butadiene portion is hydrogenated. Preferentially, the partially hydrogenated polystyrene and poly(butadiene/styrene) block copolymer is hydrogenated such that a proportion ranging from 25 mol % to 80 mol %, and preferably from 40 mol % to 70 mol %, of the double bonds in the butadiene portion is hydrogenated.

Within the meaning of the present invention, the styrene part of the SBR blocks may be composed of monomers chosen from styrene monomers, and especially selected from the group consisting of unsubstituted styrene, substituted styrenes and mixtures thereof. Among the substituted styrenes, those selected from the group consisting of methylstyrenes (preferentially o-methylstyrene, m-methylstyrene and p-methylstyrene, alpha-methylstyrene, alpha,2-dimethylstyrene, alpha,4-dimethylstyrene and diphenylethylene), para-tert-butylstyrene, chlorostyrenes (preferentially o-chlorostyrene, m-chlorostyrene, p-chlorostyrene, 2,4-dichlorostyrene, 2,6-dichlorostyrene and 2,4,6-trichlorostyrene), bromostyrenes (preferentially o-bromostyrene, m-bromostyrene, p-bromostyrene, 2,4-dibromostyrene, 2,6-dibromostyrene and 2,4,6-tribromostyrenes), fluorostyrenes (preferentially o-fluorostyrene, m-fluorostyrene, p-fluorostyrene, 2,4-difluorostyrene, 2,6-difluorostyrene and 2,4,6-trifluorostyrenes), para-hydroxystyrene and mixtures thereof will preferentially be chosen.

According to a preferential embodiment of the invention, the elastomer blocks of the TPE with SBR and PS blocks have, in total, a number-average molecular weight ("Mn") ranging from 25 000 g/mol to 350 000 g/mol, preferably from 35 000 g/mol to 250 000 g/mol, so as to confer good elastomeric properties and sufficient mechanical strength compatible with the use as tyre tread on the TPE with SBR and PS blocks.

The elastomer block may also consist of several elastomer blocks as defined above.

1.1.3. Nature of the Thermoplastic Blocks

Use will be made, for the definition of the thermoplastic blocks, of the characteristic of glass transition temperature (Tg) of the rigid thermoplastic block. This characteristic is well known to those skilled in the art. It especially makes it possible to choose the industrial processing (transformation) temperature. In the case of an amorphous polymer (or polymer block), the processing temperature is chosen to be substantially greater than the Tg. In the specific case of a semicrystalline polymer (or polymer block), a melting point may be observed which is then greater than the glass transition temperature. In this case, it is instead the melting point (M.p.) which makes it possible to choose the processing temperature for the polymer (or polymer block) under consideration. Thus, subsequently, when reference is made to "Tg (or M.p., if appropriate)", it will be necessary to consider that this is the temperature used to choose the processing temperature.

For the requirements of the invention, the TPE elastomers with SBR and PS blocks comprise one or more thermoplastic block(s) preferably having a Tg (or M.p., if appropriate) of greater than or equal to 80° C. and composed of polymerized styrene (PS) monomers. Preferentially, this thermoplastic block has a Tg (or M.p., if appropriate) within a range varying from 80° C. to 250° C. Preferably, the Tg (or M.p., if appropriate) of this thermoplastic block is preferentially from 80° C. to 200° C., more preferentially from 80° C. to 180° C.

The fraction of thermoplastic PS block in the TPE with SBR and PS blocks is within a range extending from 5% to 70%, preferentially from 8% to 60% and more preferentially from 10% to 50%.

The thermoplastic blocks of the TPE with SBR blocks are polystyrene blocks. The preferential polystyrenes are obtained from styrene monomers selected from the group consisting of unsubstituted styrene, substituted styrenes and mixtures thereof. Among the substituted styrenes, those selected from the group consisting of methylstyrenes (preferentially o-methylstyrene, m-methylstyrene and p-methylstyrene, alpha-methylstyrene, alpha,2-dimethylstyrene, alpha,4-dimethylstyrene and di phenyl ethylene), para-tert-butylstyrene, chlorostyrenes (preferentially o-chlorostyrene, m-chlorostyrene, p-chlorostyrene, 2,4-dichlorostyrene, 2,6-dichlorostyrene and 2,4,6-trichlorostyrene), bromostyrenes (preferentially o-bromostyrene, m-bromostyrene, p-bromostyrene, 2,4-dibromostyrene, 2,6-dibromostyrene and 2,4,6-tribromostyrene), fluorostyrenes (preferentially o-fluorostyrene, m-fluorostyrene, p-fluorostyrene, 2,4-difluorostyrene, 2,6-difluorostyrene and 2,4,6-trifluorostyrene), para-hydroxystyrene and mixtures thereof will preferentially be chosen.

Very preferentially, the thermoplastic blocks of the TPE with SBR blocks are blocks obtained from unsubstituted polystyrene.

According to a variant of the invention, the polystyrene block as defined above can be copolymerized with at least one other monomer, so as to form a thermoplastic block having a Tg (or M.p., if appropriate) as defined above.

By way of illustration, this other monomer capable of copolymerizing with the polymerized monomer can be chosen from diene monomers, more particularly conjugated diene monomers having from 4 to 14 carbon atoms, and monomers of vinylaromatic type having from 8 to 20 carbon atoms.

According to the invention, the thermoplastic blocks of the TPE with SBR and PS blocks have, in total, a number-average molecular weight ("Mn") ranging from 5000 g/mol to 150 000 g/mol, so as to confer good elastomeric properties and sufficient mechanical strength compatible with the use as tyre tread on the TPE with SBR and PS blocks.

The thermoplastic block may also consist of several thermoplastic blocks as defined above.

1.1.4. Examples of TPE with SBR and PS Blocks

By way of examples of commercially available TPE elastomers with SBR and PS blocks, mention may be made of SOE-type elastomers, sold by Asahi Kasei under the name SOE 51611, SOE L605, or else SOE L606.

Among them, for example, the SOE SOE L606 from Asahi Kasei is classified as essentially hydrogenated with 0.6% polybutadiene, 49.7% hydrogenated polybutadiene (that is to say 98.8% hydrogenation), and 49.7% styrene.

The SOE SOE 51611 from Asahi Kasei is classified, for example, as partially hydrogenated, with 19.7% polybutadiene, 18.6% hydrogenated polybutadiene (i.e. 48.5% hydrogenation) and 61.7% of styrene.

1.1.5. Amount of TPE with SBR and PS Blocks

In the tread composition of the tyre of the invention, the TPE elastomer (that is to say the TPE elastomer(s)) with SBR and PS blocks represents between 1 and 65%, preferably between 10 and 60% by weight, more preferentially from 20 to 50% and very preferentially from 30 to 45% by weight of all the elastomers present in the elastomer composition.

Thus, the amount of TPE elastomer with SBR and PS blocks is within a range which varies between 1 and 65 phr, preferentially from 10 to 60 phr, better still from 20 to 50 phr and especially from 30 to 45 phr. Indeed, with an amount of TPE elastomer with SBR and PS blocks of less than 1 phr, the effect on the decrease in rolling resistance is hardly noticeable, whereas above 65 phr of TPE elastomer with SBR and PS blocks, the composition assumes a thermoplastic nature with the consequence of a very large change in properties with temperature.

Preferentially, the thermoplastic elastomer system comprises from 20 to 50 phr, preferably from 25 to 35, of essentially hydrogenated polystyrene and poly(butadiene/styrene) block copolymer and from 1 to 15 phr, preferably from 3 to 10 phr of partially hydrogenated polystyrene and poly(butadiene/styrene) block copolymer.

1.2. Diene Elastomer

The composition of the tread according to the invention comprises at least one (that is to say one or more) diene rubber. The total content of diene elastomer is between 35 and 99 phr, preferably in a range varying from 40 to 90 phr, preferentially from 50 to 80 phr, more preferentially from 55 to 70 phr.

"Diene" elastomer or rubber should be understood, in a known way, to mean an (one or more is understood) elastomer resulting at least in part (i.e., a homopolymer or a copolymer) from diene monomers (monomers bearing two conjugated or non-conjugated carbon-carbon double bonds).

These diene elastomers can be classified into two categories: "essentially unsaturated" or "essentially saturated".

"Essentially unsaturated" is generally understood to mean a diene elastomer resulting at least in part from conjugated diene monomers having a content of units of diene origin (conjugated dienes) which is greater than 15% (mol %). In the category of "essentially unsaturated" diene elastomers, "highly unsaturated" diene elastomer is understood in particular to mean a diene elastomer having a content of units of diene origin (conjugated dienes) which is greater than 50%.

Thus it is that diene elastomers such as some butyl rubbers or copolymers of dienes and of α-olefins of EPDM type can be described as "essentially saturated" diene elastomers (low or very low content of units of diene origin, always less than 15%).

Given these definitions, diene elastomer, regardless of the above category, capable of being used in the compositions in accordance with the invention, is understood more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene, of an α-olefin having from 3 to 6 carbon atoms with a non-conjugated diene monomer having from 6 to 12 carbon atoms, such as, for example, the elastomers obtained from ethylene, and of propylene with a non-conjugated diene monomer of the abovementioned type, such as, especially, 1,4-hexadiene, ethylidene norbornene or dicyclopentadiene;

(d)—a copolymer of isobutene and isoprene (diene butyl rubber) and also the halogenated versions, in particular chlorinated or brominated versions, of this type of copolymer.

Any type of diene elastomer can be used in the invention. When the composition contains a vulcanization system, use is preferably made of essentially unsaturated elastomers, in particular of the types (a) and (b) above, in the manufacture of the tyre tread according to the present invention.

The following are especially suitable as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can contain between 99% and 20% by weight of diene units and between 1% and 80% by weight of vinylaromatic units. The elastomers can have any microstructure which depends on the polymerization conditions used, especially on the presence or absence of a modifying and/or randomizing agent and on the amounts of modifying and/or randomizing agent employed. The elastomers can, for example, be prepared in dispersion or in solution; they can be coupled and/or star-branched or else functionalized with a coupling and/or star-branching or functionalization agent. For coupling to carbon black, mention may be made, for example, of functional groups comprising a C—Sn bond or aminated functional groups, such as benzophenone, for example; for coupling to a reinforcing inorganic filler, such as silica, mention may be made, for example, of silanol functional groups or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973). Mention may also be made, as other examples of functionalized elastomers, of elastomers (such as SBR, BR, NR or IR) of the epoxidized type.

1.3. PPE Resin

The elastomers described above are sufficient by themselves for the tread according to the invention to be usable. Preferentially, the composition according to the invention can also comprise a thermoplastic resin based on optionally substituted polyphenylene ether units (abbreviated to "PPE resin"). This type of compound is described for example in the encyclopaedia "Ullmann's Encyclopedia of Industrial Chemistry" published by VCH, vol. A 21, pages 605-614, 5th edition, 1992.

The PPE resin usable according to the invention preferentially has a glass transition temperature (Tg), measured by DSC according to standard ASTM D3418, 1999, within a range extending from 0 to 280° C., preferably from 5 to 250° C. and more preferentially from 5 to 220° C. Below 0° C. the PPE resin does not enable a sufficient shift of the Tg in the composition which comprises it and above 280° C. manufacturing problems, especially in terms of obtaining a homogeneous mixture, may be encountered.

Preferably, the PPE resin is a compound comprising predominantly polyphenylene units of general formula (I):

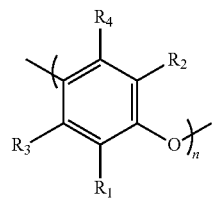

in which:
R1, R2, R3 and R4 represent, independently of one another, identical or different groups selected from hydrogen; hydroxyl, alkoxy, halogen, amino, alkylamino or dialkylamino groups; hydrocarbon-based groups comprising at least 2 carbon atoms, optionally interrupted by heteroatoms and optionally substituted; R1 and R3 on the one hand, and R2 and R4 on the other hand, may form, together with the carbon atoms to which they are attached, one or more rings fused to the benzene ring of the compound of formula (I),
n is an integer within a range extending from 3 to 300.

Preferentially, R1, R2, R3 and R4 represent, independently of one another, identical or different groups selected from:
hydrogen,
hydroxyl, alkoxy, halogen, amino, alkylamino or dialkylamino groups,
linear, branched or cyclic alkyl groups, comprising from 1 to 25 carbon atoms (preferably from 2 to 18), optionally interrupted by heteroatoms selected from nitrogen, oxygen and sulfur and optionally substituted by hydroxyl, alkoxy, amino, alkylamino, dialkylamino or halogen groups,
aryl groups comprising from 6 to 18 carbon atoms (preferably from 6 to 12), optionally substituted by hydroxyl, alkoxy, amino, alkylamino, dialkylamino, alkyl or halogen groups.

More preferentially, R1, R2, R3 and R4 represent, independently of one another, identical or different groups selected from:
hydrogen,
hydroxyl groups, alkoxy groups comprising from 1 to 6 carbon atoms, halogen groups, amino groups, alkylamino groups comprising from 1 to 6 carbon atoms, or dialkylamino groups comprising from 2 to 12 carbon atoms,
linear, branched or cyclic alkyl groups, comprising from 1 to 12 carbon atoms (preferably from 2 to 6), optionally interrupted by heteroatoms and optionally substituted by hydroxyl groups, alkoxy groups comprising from 1 to 6 carbon atoms, amino groups, alkylamino groups comprising from 1 to 6 carbon atoms, dialkylamino groups comprising from 2 to 12 carbon atoms, or halogen groups,
aryl groups comprising from 6 to 18 carbon atoms (preferably from 6 to 12), optionally substituted by hydroxyl groups, alkoxy groups comprising from 1 to 6 atoms, amino groups, alkylamino groups comprising from 1 to 6 atoms, dialkylamino groups comprising from 2 to 12 carbon atoms, alkyl groups comprising from 1 to 12 carbon atoms, or halogen groups.

Even more preferentially, R1 and R2 represent an alkyl group and in particular a methyl group, and R3 and R4 represent hydrogen atoms. In this case, the PPE resin is a poly(2,6-dimethyl-1,4-phenylene ether).

Also preferentially, n is an integer within a range extending from 3 to 50, more preferentially from 5 to 30 and preferably from 6 to 20.

Preferably, the PPE resin is a compound comprising more than 80% by weight, and more preferentially still more than 95% by weight, of polyphenylene units of general formula (I).

Mention may be made, as examples, of poly(2,6-dimethyl-1,4-phenylene ether) and especially Noryl SA 120 from SABIC or Xyron S202 from Asahi Kasei.

In a known way, PPE resins have number-average molecular weights (Mn) which are variable, especially from approximately 1000 to 45 000 g/mol, commonly from 15 000 to 45 000 g/mol, Mn being measured in a way known to those skilled in the art by SEC (also referred to as GPC, as in reference U.S. Pat. No. 4,588,806, column 8). For the purposes of the invention, a PPE resin having a weight Mn in a range varying from 10 000 to 45 000 g/mol, preferentially from 15 000 to 40 000 g/mol, and more preferentially from 25 000 to 40 000 g/mol, is preferred for the composition of the invention.

Preferentially, the value of the polydispersity index PI (reminder: PI=Mw/Mn, with Mw the weight-average molecular weight and Mn the number-average molecular weight) of the PPE resin is less than or equal to 5, more preferentially less than or equal to 3 and more preferentially still less than or equal to 2.

When it is present in the composition, the content of PPE resin in the composition is preferentially within a range extending from 1 to 50 phr, more preferentially from 2 to 40 phr, more preferentially still from 2 to 30 phr and very preferentially from 2 to 20 phr.

1.4. Nanometric or Reinforcing Filler

The elastomers described above are sufficient by themselves for the tread according to the invention to be usable. Preferentially, the composition according to the invention can also comprise a reinforcing filler.

When a reinforcing filler is used, use may be made of any type of filler commonly used for the manufacture of tyres, for example an organic filler, such as carbon black, an inorganic filler, such as silica, or else a blend of these two types of filler, especially a blend of carbon black and silica. Preferentially for the purposes of the invention, the predominant reinforcing filler may be silica, or alternatively carbon black.

All the carbon blacks conventionally used in tyres ("tyre-grade" blacks) are suitable as carbon blacks. Mention will more particularly be made, for example, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772), indeed even N990.

"Reinforcing inorganic filler" should be understood, in the present application, by definition, as meaning any inorganic or mineral filler (regardless of its colour and its origin, natural or synthetic), also known as "white filler", "clear filler" or indeed even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Needless to say, the term "reinforcing inorganic filler" also means mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are especially suitable as reinforcing inorganic fillers. The silica used can be any reinforcing silica known to those skilled in the art, especially any precipitated or fumed silica having a BET surface area and a CTAB specific surface area which are both less than 450 $m^2$/g, preferably from 30 to 400 $m^2$/g. Mention will be made, as highly dispersible precipitated silicas (HDSs), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/016387.

In order to couple the reinforcing inorganic filler to the elastomer, it is possible, for example, to use, in a known way, an at least bifunctional coupling agent (or bonding agent) intended to provide a satisfactory connection, of chemical and/or physical nature, between the inorganic filler (surface of its particles) and the elastomer, in particular bifunctional organosilanes or polyorganosiloxanes.

The content by volume of optional reinforcing filler in the composition (carbon black and/or reinforcing inorganic filler, such as silica) is within a range from 0 to 20%, which corresponds to a content of 0 to 50 phr for a plasticizer-free composition. Preferentially, the composition comprises less than 80 phr of reinforcing filler (especially between 1 and 80 phr), preferably less than 60 phr (especially between 1 and 60 phr), more preferentially a content within a range extending from 3 to 50 phr, better still from 5 to 40 phr.

1.5. Plasticizers

The elastomers described above are sufficient by themselves for the tread according to the invention to be usable.

Thus, according to a preferential embodiment of the invention, the elastomer composition described above does not comprise any plasticizing agent of the oil or thermoplastic resin type other than an optional PPE resin, or, if it does comprise same, it comprises less than 20 phr (especially between 0.5 and 20 phr), preferably less than 15 phr (especially between 0.5 and 15 phr), more preferentially less than 10 phr (especially between 0.5 and 10 phr) and better still less than 5 phr (especially between 0.5 and 5 phr) thereof. Also preferentially, the composition does not comprise any plasticizing agent other than an optional PPE resin. As is known to those skilled in the art, plasticizing agent is used to refer to an oil (or a plasticizing or extending oil) or a plasticizing resin, the role of which is to facilitate the processing of the tread, particularly its incorporation into the tyre, by lowering the modulus and increasing the tackifying power.

Use may be made of any oil, preferably having a weakly polar nature, capable of extending or plasticizing elastomers, especially thermoplastic elastomers. At ambient temperature (23° C.), these oils, which are more or less viscous, are liquids (that is to say, as a reminder, substances which have the ability to eventually assume the shape of their container), in contrast especially to resins or rubbers, which are by nature solids. Use may also be made of any type of plasticizing resin known to those skilled in the art.

Those skilled in the art will know, in the light of the description and the following exemplary embodiments, how to adjust the amount of plasticizer as a function of the TPE elastomer with SBR and PS blocks used (as indicated above) and of the specific conditions of use of the tyre provided with the tread, and especially as a function of the pneumatic article in which it is intended to be used.

1.6. Various Additives

The thermoplastic elastomers described above are sufficient by themselves for the tread according to the invention to be usable.

However, according to a preferential embodiment of the invention, the elastomer composition described above may also comprise the various additives usually present in treads known to those skilled in the art. The choice will be made, for example, of one or more additives chosen from protection agents, such as antioxidants or antiozonants, UV stabilizers, various processing aids or other stabilizers, or else promoters capable of promoting the adhesion to the remainder of the structure of the pneumatic article.

Also, and optionally, the composition of the tread of the invention may contain a crosslinking system known to those skilled in the art, such as a vulcanization system comprising sulfur or a sulfur donor, and optionally one or more vulcanization activators and/or accelerators.

2. Preparation

The tread compositions for the tyre according to the invention are manufactured in appropriate mixers, using two successive phases of preparation which are well known to those skilled in the art: a first phase of thermomechanical working or kneading (sometimes referred to as "non-productive" phase) at high temperature, up to a maximum temperature of between 110° C. and 190° C., preferably between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system is incorporated; such phases have been described, for example, in applications EP-A-0 501 227, EP-A-0 735 088, EP-A-0 810 258, WO00/05300 or WO00/05301. The TPE elastomers with SBR and PS blocks are introduced during the first step, directly in their commercial form, for example in the form of beads or granules.

The tread for the tyre according to the invention is then extruded in a conventional manner in order to produce the profiled element. The tread pattern is then sculpted in the mould for curing the tyre.

This tread may be mounted on a tyre in a conventional way, said tyre comprising, in addition to the tread according to the invention, a crown, two sidewalls and two beads, a carcass reinforcement anchored to the two beads, and a crown reinforcement.

EXEMPLARY EMBODIMENTS OF THE INVENTION

Tyre tread compositions according to the invention were prepared as indicated above.

Tests Carried Out in the Laboratory on the Compositions

Dynamic Properties

The dynamic properties G* and tan(δ)max are measured on a viscosity analyser (Metravib V A4000) according to standard ASTM D 5992-96. The response of a sample of vulcanized composition (cylindrical test specimen 4 mm thick and 400 mm$^2$ in cross section), subjected to sinusoidal loading in simple alternating shear stress at a frequency of 10 Hz, according to standard ASTM D 1349-99, at a temperature of 40° C., is recorded. A peak-to-peak strain amplitude sweep is carried out from 0.1 to 50% (outward cycle), then from 50% to 1% (return cycle). The results made use of are the complex dynamic shear modulus (G*) and the loss factor (tan δ). The maximum value of tan δ observed (tan(δ)max) and the difference in complex modulus (DG*) between the values at 0.1% and 50% strain (Payne effect) are shown for the return cycle.

The lower the value for the tan(δ)max at 40° C., the lower will be the hysteresis of the composition and thus the lower will be the rolling resistance. For greater readability, the results will be shown in terms of performance in base 100, the value 100 being assigned to the control. A result of less than 100 indicates a decrease in rolling resistance performance (increase of the value of tan(δ)max at 40° C.), and conversely, a result of greater than 100 will indicate an increase in performance (decrease of the value of tan(δ)max at 40° C.).

Coefficient of Dynamic Friction

The measurements of the coefficient of dynamic friction were carried out according to a method identical to that described by L. Busse, A. Le Gal, and M. Küppel (Modelling of Dry and Wet Friction of Silica Filled Elastomers on Self-Affine Road Surfaces, Elastomer Friction, 2010, 51, p. 8). The specimens are produced by moulding followed by vulcanization of a square specimen (50 mm×50 mm) of 6 mm thickness. After closing the mould, the latter is placed in a press comprising heated platens at 150° C. for 50 minutes at a pressure of 16 bar. The surface used to carry out these measurements is a core withdrawn from a real road surface made of bituminous concrete of BBTM type (standard NF P 98-137). In order to prevent the phenomena of dewetting and the appearance of secondary grip forces between the ground and the material, the ground+test specimen system is immersed in a 5% aqueous solution of a surfactant (Sinnozon—CAS number: 25155-30-0). The temperature of the aqueous solution is regulated using a thermostatic bath. The test specimen is subjected to a sliding movement in translation parallel to the plane of the ground. The sliding velocity SV is set at 0.03 msec. The normal stress applied sn is 100 kPa. These conditions are described below by "wet ground conditions". The tangential stress st, opposed to the movement of the test specimen over the ground, is measured continuously. The ratio of the tangential stress st to the normal stress sn gives the coefficient of dynamic friction μ. The values shown in the table below are the values of coefficient of dynamic friction obtained under continuous operating conditions after stabilization of the value of the tangential stress st.

For greater readability, the results will be shown in terms of performance in base 100, the value 100 being assigned to the control. A result of less than 100 indicates decrease of the wet grip performance, and, conversely, a result of greater than 100 will indicate an increase in the wet grip performance.

Examples

Tyre tread compositions in accordance with the invention (A2, A3 and A4) were prepared as indicated above and compared to two control compositions: a conventional tyre tread composition (A0) and a composition without the blend of thermoplastic elastomer with SBR and PS blocks (A1). The compositions of these treads are presented in Table 1 below.

TABLE 1

| Composition | A-0 | A-1 | A-2 | A-3 | A-4 |
|---|---|---|---|---|---|
| BR (1) | 15 | 0 | 0 | 0 | 0 |
| SBR (2) | 85 | 60 | 60 | 60 | 60 |
| TPE elastomer (3) | 0 | 40 | 35 | 30 | 35 |
| TPE elastomer (4) | 0 | 0 | 5 | 10 | 5 |
| PPE resin (5) | 0 | 0 | 0 | 0 | 5 |
| Carbon black (6) | 5 | 5 | 5 | 5 | 5 |
| Silica (7) | 70 | 26 | 26 | 26 | 26 |
| Coupling agent (8) | 6 | 2 | 2 | 2 | 2 |
| Oil (9) | 2 | 0 | 0 | 0 | 0 |
| Resin (10) | 15 | 0 | 0 | 0 | 0 |
| Antiozone wax | 1.5 | 1.5 | 1.5 | 1.5 | 1.5 |
| Antioxidant (11) | 2 | 2 | 2 | 2 | 2 |
| DPG (12) | 1.3 | 0.5 | 0.5 | 0.5 | 0.5 |
| ZnO (13) | 0.5 | 0.5 | 0.5 | 0.5 | 0.5 |
| Stearic acid (14) | 2 | 2 | 2 | 2 | 2 |
| CBS (15) | 1.7 | 1.7 | 1.7 | 1.7 | 1.7 |
| Sulfur | 1 | 1 | 1 | 1 | 1 |

(1) BR with 4% of 1,2- units and 93% of cis-1,4- units (Tg = −106° C.);
(2) Solution SSBR (contents expressed as dry SBR: 41% of styrene, 24% of 1,2-polybutadiene units and 50% of trans-1,4-polybutadiene units (Tg = −25° C.));
(3) Essentially hydrogenated SOE thermoplastic elastomer, SOE L606 from Asahi Kasei, with 0.6% polybutadiene, 49.7% hydrogenated polybutadiene (98.8% hydrogenation), 49.7% styrene;
(4) SOE thermoplastic elastomer, SOE S1611 from Asahi Kasei, with 19.7% polybutadiene, 18.6% hydrogenated polybutadiene (48.5% hydrogenation), 61.7% styrene;
(5) PPE resin: Poly(2,6-dimethyl-1,4-phenylene ether), Xyron S202 A from Asahi Kasei, Mn = 37 000 g/mol, Tg = 215° C.;
(6) Carbon black N234;
(7) Silica (Zeosil 1165MP, from Rhodia);
(8) TESTP coupling agent (Si69, from Degussa);
(9) MES oil, Catenex SNR from Shell;
(10) C5/C9 resin, Cray Valley Wingtack, from STS;
(11) N-(1,3-Dimethylbutyl)-N-phenyl-para-phenylenediamine (Santoflex 6-PPD from Flexsys);
(12) DPG = Diphenylguanidine (Perkacit DPG from Flexsys);
(13) Zinc oxide (industrial grade Umicore);
(14) Stearin (Pristerene from Uniqema);
(15) N-Cyclohexyl-2-benzothiazolesulfenamide (Santocure CBS from Flexsys).

In these compositions, the possibility of reducing the content of reinforcing filler and plasticizer relative to the control composition may be noted, by virtue of the use of TPE elastomers with SBR and PS blocks in a blend with the diene elastomer in the tread composition.

The performance properties of the invention were evaluated in the laboratory, and the results are shown in Table 2 below.

TABLE 2

| Composition | A-0 | A-1 | A-2 | A-3 | A-4 |
|---|---|---|---|---|---|
| Hysteresis performance (base 100) | 52 | 100 | 96 | 90 | 93 |
| Dry grip performance (base 100) | 112 | 100 | 116 | 119 | 119 |
| Mean of hysteresis and grip performance properties | 82 | 100 | 102 | 104.5 | 106 |

The results presented in Table 2 demonstrate that the compositions according to the invention make it possible to replace part of the diene elastomer by a TPE with SBR and PS blocks, and that by a blend of two TPEs with SBR and PS blocks, one of which is essentially hydrogenated, it is possible to obtain a noticeable improvement in the balance of the performance properties (A2 to A4) which can be expected in terms of rolling resistance and wet braking. Moreover, it is very surprising, in light of the state of the art, that the TPE with SBR and PS blocks in a blend with a diene elastomer make it possible to significantly reduce the amount of filler and plasticizer in the tread composition, thereby enabling economy of means and ease of processing.

The invention claimed is:

1. A tire comprising a tread, a crown with a crown reinforcement, two sidewalls, two beads, a carcass reinforcement anchored to the two beads and extending from one sidewall to the other, said tread comprising a composition based on at least:
a diene elastomer, at a content of between 35 and 99 phr (parts by weight per hundred parts of elastomer); and
a thermoplastic elastomer system, at a total content of between 1 and 65 phr, said thermoplastic elastomer system comprising at least two polystyrene and poly(butadiene/styrene) block copolymers each comprising:
at least one elastomer block of optionally hydrogenated butadiene/styrene random copolymer type; and
at least one thermoplastic block of styrene type,
wherein one of the at least two polystyrene and poly(butadiene/styrene) block copolymers is an essentially hydrogenated polystyrene and poly(butadiene/styrene) block copolymer having hydrogenation such that a proportion ranging from 95 to 100 mol % of the double bonds in the butadiene portion is hydrogenated.

2. The tire according to claim 1, wherein the content of diene elastomer is within a range extending from 40 to 90 phr and the content of thermoplastic elastomer system is within a range extending from 10 to 60 phr.

3. The tire according to claim 2, wherein the content of diene elastomer is within a range extending from 50 to 80 phr and the content of thermoplastic elastomer is within a range extending from 20 to 50 phr.

4. The tire according to claim 3, wherein the content of diene elastomer is within a range extending from 55 to 70 phr and the total content of thermoplastic elastomer is within a range extending from 30 to 45 phr.

5. The tire according to claim 1, wherein the number-average molecular weight of the at least two polystyrene and poly(butadiene/styrene) block copolymers is between 30 000 and 500 000 g/mol.

6. The tire according to claim 1, wherein the at least one elastomer block of optionally hydrogenated butadiene/styrene random copolymer type is selected from poly(butadiene/styrene)s having a glass transition temperature of less than 25° C.

7. The tire according to claim 1, wherein the at least one elastomer block of optionally hydrogenated butadiene/styrene random copolymer type has a styrene content within a range extending from 10 to 60%.

8. The tire according to claim 1, wherein the at least one elastomer block of optionally hydrogenated butadiene/styrene random copolymer type has a content of 1,2-bonds for the butadiene part within a range extending from 4 mol % to 75 mol % and a content of 1,4-bonds within a range extending from 20 mol % to 96 mol %.

9. The tire according to claim 1, wherein the essentially hydrogenated polystyrene and poly(butadiene/styrene) block copolymer is hydrogenated such that a proportion ranging from 96 to 100 mol % of the double bonds in the butadiene portion is hydrogenated.

10. The tire according to claim 9, wherein the essentially hydrogenated polystyrene and poly(butadiene/styrene) block copolymer is hydrogenated such that a proportion ranging from 98 to 100 mol % of the double bonds in the butadiene portion is hydrogenated.

11. The tire according to claim 1, wherein the thermoplastic elastomer system comprises, in addition to the essentially hydrogenated polystyrene and poly(butadiene/styrene) block copolymer, a partially hydrogenated polystyrene and poly(butadiene/styrene) block copolymer having hydrogenation such that a proportion ranging from 25 to 95 mol % of the double bonds in the butadiene portion is hydrogenated.

12. The tire according to claim 11, wherein the partially hydrogenated polystyrene and poly(butadiene/styrene) block copolymer is hydrogenated such that a proportion ranging from 25 mol % to 80 mol % of the double bonds in the butadiene portion is hydrogenated.

13. The tire according to claim 12, wherein the partially hydrogenated polystyrene and poly(butadiene/styrene) block copolymer is hydrogenated such that a proportion ranging from 40 mol % to 70 mol % of the double bonds in the butadiene portion is hydrogenated.

14. The tire according to claim 11, wherein the thermoplastic elastomer system comprises from 20 to 50 phr of essentially hydrogenated polystyrene and poly(butadiene/styrene) block copolymer and from 1 to 15 phr of partially hydrogenated polystyrene and poly(butadiene/styrene) block copolymer.

15. The tire according to claim 14, wherein the thermoplastic elastomer system comprises from 25 to 35 phr of essentially hydrogenated polystyrene and poly(butadiene/styrene) block copolymer and from 3 to 10 phr of partially hydrogenated polystyrene and poly(butadiene/styrene) block copolymer.

16. The tire according to claim 1, wherein the at least one thermoplastic block of styrene type is selected from polymers having a glass transition temperature of greater than 80° C. and, in the case of a semicrystalline thermoplastic block, a melting point of greater than 80° C.

17. The tire according to claim 1, wherein a fraction of the at least one thermoplastic block of styrene type in the at least two polystyrene and poly(butadiene/styrene) block copolymers is within a range extending from 5 to 70%.

18. The tire according to claim 1, wherein the at least one thermoplastic block of styrene type is selected from polystyrenes.

19. The tire according to claim 18, wherein the at least one thermoplastic block of styrene type is selected from polystyrenes obtained from styrene monomers selected from the group consisting of unsubstituted styrene, substituted styrenes and mixtures thereof.

20. The tire according to claim 19, wherein the at least one thermoplastic block of styrene type is selected from polystyrenes obtained from styrene monomers selected from the group consisting of unsubstituted styrene, methyl styrenes, para-tert-butyl styrene, chlorostyrenes, bromostyrenes, fluorostyrenes, para-hydroxystyrene and mixtures thereof.

21. The tire according to claim 20, wherein the at least one thermoplastic block of styrene type is selected from polystyrenes obtained from styrene monomers selected from the group consisting of unsubstituted styrene, o-methyl styrene, m-methyl styrene, p-methyl styrene, alpha-methylstyrene, alpha,2-dimethyl styrene, alpha,4-dimethyl styrene, diphenylethylene, para-tert-butylstyrene, o-chlorostyrene, m-chlorostyrene, p-chlorostyrene, 2,4-dichlorostyrene, 2,6-dichlorostyrene, 2,4,6-trichlorostyrene, o-bromostyrene, m-bromostyrene, p-bromostyrene, 2,4-dibromostyrene, 2,6-dibromostyrene, 2,4,6-tribromostyrene, o-fluorostyrene, m-fluorostyrene, p-fluorostyrene, 2,4-difluorostyrene, 2,6-difluorostyrene, 2,4,6-trifluorostyrene, para-hydroxystyrene and mixtures thereof.

22. The tire according to claim 21, wherein the at least one thermoplastic block of styrene type is obtained from unsubstituted polystyrene.

23. The tire according to claim 1, wherein the diene elastomer is selected from the group consisting of essentially unsaturated diene elastomers and mixtures thereof.

24. The tire according to claim 23, wherein the diene elastomer is selected from the group consisting of homopolymers obtained by polymerization of a conjugated diene monomer having from 4 to 12 carbon atoms, copolymers obtained by copolymerization of one or more conjugated dienes with one another or with one or more vinylaromatic compounds having from 8 to 20 carbon atoms, and mixtures thereof.

25. The tire according to claim 24, wherein the diene elastomer is selected from the group consisting of polybutadienes, synthetic polyisoprenes, natural rubber, butadiene copolymers, isoprene copolymers and mixtures thereof.

26. The tire according to claim 1, wherein the composition further comprises reinforcing filler at a content of less than 80 phr.

27. The tire according to claim 26, wherein the content of reinforcing filler is less than 60 phr.

28. The tire according to claim 27, wherein the content of reinforcing filler is from 3 to 50 phr.

29. The tire according to claim 28, wherein the content of reinforcing filler is from 5 to 40 phr.

30. The tire according to claim 26, wherein the reinforcing filler is carbon black, silica or a mixture thereof.

31. The tire according to claim 26, wherein silica is a predominant reinforcing filler.

32. The tire according to claim 26, wherein carbon black is a predominant reinforcing filler.

33. The tire according to claim 1, wherein the composition further comprises a thermoplastic resin based on optionally substituted polyphenylene ether units, at a content within a range extending from 1 to 50 phr.

34. The tire according to claim 33, wherein the content of the thermoplastic resin is within a range extending from 2 to 40 phr.

35. The tire according to claim 34, wherein the content of the thermoplastic resin is within a range extending from 2 to 30 phr.

36. The tire according to claim 35, wherein the content of the thermoplastic resin is within a range extending from 2 to 20 phr.

37. The tire according to claim 33, wherein the thermoplastic resin has a glass transition temperature Tg, measured by DSC according to standard ASTM D3418, 1999, within a range extending from 0 to 280° C.

38. The tire according to claim 37, wherein the thermoplastic resin has a glass transition temperature Tg, measured by DSC according to standard ASTM D3418, 1999, within a range extending from 5 to 250° C.

39. The tire according to claim 33, wherein the thermoplastic resin is a compound comprising predominantly polyphenylene units of general formula (I):

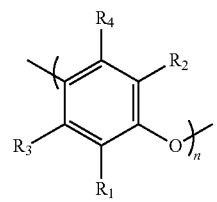

wherein $R_1$, $R_2$, $R_3$ and $R_4$ represent, independently of one another, identical or different groups selected from the group consisting of hydrogen, hydroxy, alkoxy, halogen, amino, alkylamino or dialkylamino groups or hydrocarbon-based groups comprising at least 2 carbon atoms, optionally interrupted by heteroatoms and optionally substituted;

wherein $R_1$ and $R_3$ taken together, and $R_2$ and $R_4$ taken together, may form, together with the carbon atoms to which they are attached, one or more rings fused to the benzene ring of the compound of formula (I); and wherein n is an integer within a range extending from 3 to 300.

40. The tire according to claim 39, wherein $R_1$ and $R_2$ each represents an alkyl group and $R_3$ and $R_4$ each represents a hydrogen atom.

41. The tire according to claim 40, wherein $R_1$ and $R_2$ each represents a methyl group.

42. The tire according to claim 39, wherein n is an integer within a range extending from 3 to 50.

43. The tire according to claim 42, wherein n is an integer within a range extending from 5 to 30.

44. The tire according to claim 43, wherein n is an integer within a range extending from 6 to 20.

45. The tire according to claim 39, wherein the thermoplastic resin is a compound which comprises more than 80% by weight of polyphenylene units of general formula (I).

46. The tire according to claim 45, wherein the thermoplastic resin is a compound which comprises more than 95% by weight of polyphenylene units of general formula (I).

47. The tire according to claim 1, wherein the composition does not comprise a plasticizing system other than an optional thermoplastic resin or comprises a plasticizing system with a total plasticizer content of less than 20 phr.

48. The tire according to claim 47, wherein the composition comprises a plasticizing system with a total plasticizer content of less than 15 phr.

49. The tire according to claim 48, wherein the composition comprises a plasticizing system with a total plasticizer content of less than 10 phr.

50. The tire according to claim 49, wherein the composition comprises a plasticizing system with a total plasticizer content of less than 5 phr.

51. The tire according to claim 1, wherein the composition further comprises a crosslinking system.

* * * * *